(12) United States Patent
Becker

(10) Patent No.: US 7,923,418 B2
(45) Date of Patent: Apr. 12, 2011

(54) EMULSION BREAKER

(75) Inventor: Harold L. Becker, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 36 days.

(21) Appl. No.: 12/474,391

(22) Filed: May 29, 2009

(65) Prior Publication Data

US 2009/0298722 A1 Dec. 3, 2009

Related U.S. Application Data

(60) Provisional application No. 61/057,023, filed on May 29, 2008.

(51) Int. Cl.
*C09K 8/588* (2006.01)
*C08F 20/06* (2006.01)
*C08G 63/00* (2006.01)

(52) U.S. Cl. ........ 507/224; 507/221; 516/143; 516/181; 516/186; 516/187; 526/317.1; 526/318; 526/318.1; 526/318.2; 526/318.4; 528/271; 528/361

(58) Field of Classification Search .................. 507/224, 507/221; 516/143, 181, 186, 187; 526/317.1, 526/318, 318.1, 318.2, 318.4; 528/271, 361
See application file for complete search history.

(56) References Cited

U.S. PATENT DOCUMENTS 5,693,216 A * 12/1997 Hart et al. ..................... 516/148
2007/0192981 A1 8/2007 Lawshe \* cited by examiner

*Primary Examiner* — Timothy J. Kugel
(74) *Attorney, Agent, or Firm* — Mary H. Drabnis; R. Andrew Patty, II; McGlinchey Stafford, PLLC

(57) ABSTRACT

This invention provides acrylate polymers having at least two different ester groups. The ester groups are selected from the following:
a) an aralkyl group;
b) a linear alkylether group;
c) a polyethoxylated alkylaryl group; and
d) a polyethoxylated alkyl group,
with the proviso that at least one of said ester groups is selected from b) or d). Processes for preparing such polymers and processes for breaking emulsions with these acrylate polymers are also provided.

20 Claims, No Drawings

EMULSION BREAKER

REFERENCE TO RELATED APPLICATION

This application claims the benefit and priority of U.S. Provisional Application No. 61/057,023, filed May 29, 2008, now expired, the disclosure of which is incorporated herein by reference.

TECHNICAL FIELD

This invention relates to emulsion breakers for the separation of oil/water emulsions into separate phases.

BACKGROUND

Emulsions of oil and water are encountered both in the recovery of hydrocarbons from subterranean formations and in refinery operations. Currently-employed emulsion breakers (commonly called demulsifiers) are usually polymers made directly with ethylene oxide and/or propylene oxide. However, supplies of ethylene oxide and/or propylene oxide can be unreliable, causing in turn an unreliability in the supply of emulsion breakers.

SUMMARY OF THE INVENTION

This invention provides polymeric emulsion breakers made without employing ethylene oxide and/or propylene oxide in the polymerization. Methods for preparing such emulsion breakers are also provided. The emulsion breakers of the present invention are acrylate polymers, which have been found to be effective emulsion breakers.

In accordance with this invention, an embodiment is an acrylate polymer having at least two different ester groups selected from the following: a) an aralkyl group; b) a linear alkylether group having at least about four carbon atoms; c) a polyethoxylated alkylaryl group; and d) a polyethoxylated alkyl group, with the proviso that at least one of the ester groups is selected from b) or d).

Another embodiment of this invention is a process for preparing acrylate polymers, which process comprises bringing together, in a liquid organic medium, at least one acrylic acid and at least two monomeric species. The monomeric species are selected from the following: A) an aralkyl monoalcohol, B) a linear alkylether monoalcohol, C) a polyethoxylated alkylaryl monoalcohol, and D) a polyethoxylated alkyl monoalcohol, with the proviso that at least one of the monomeric species is selected from B) or D). A first reaction mixture is formed from the monomeric species, acrylic acid in the liquid organic medium; the first reaction mixture is heated to form a prepolymerization mixture. Another way to form the prepolymerization mixture is by bringing together, in a liquid organic medium, at least two monomeric species, where the monomeric species are selected from the following: A) an acrylated derivative of an aralkyl monoalcohol, B) an acrylated derivative of a linear alkylether monoalcohol, C) an acrylated derivative of a polyethoxylated alkylaryl monoalcohol, and D) an acrylated derivative of a polyethoxylated alkyl monoalcohol, with the proviso that at least one of the monomeric species is selected from B) or D). At least one free radical initiator is brought together with at least a portion of the prepolymerization mixture, to form a polymerization reaction mixture, which polymerization reaction mixture is heated to a temperature of at least about 60° C. to form an acrylate polymer.

Still another embodiment of this invention is in a process for breaking a water/oil emulsion, the improvement which comprises including an acrylate polymer in the process. The acrylate polymer has at least two different ester groups selected from the following: a) an aralkyl group; b) a linear alkylether group; c) a polyethoxylated alkylaryl group; and d) a polyethoxylated alkyl group, with the proviso that at least one of the ester groups is selected from b) or d).

These and other features of this invention will be still further apparent from the ensuing description and appended claims.

FURTHER DETAILED DESCRIPTION OF THE INVENTION

The term "acrylate polymer" is used throughout this document to refer to a polymer containing at least two different ester groups. Throughout this document, the term "monoalcohol" is used to refer to monohydric alcohols. The term "acrylated derivative" refers to an ester of an acrylic acid formed from a monoalcohol. Throughout this document, the term "monomeric species" refers to both monoalcohols and to acrylated derivatives thereof.

The acrylate polymers of this invention have at least two different ester groups selected from the following: a) an aralkyl group; b) a linear alkylether group having at least about four carbon atoms; c) a polyethoxylated alkylaryl group; and d) a polyethoxylated alkyl group, with the proviso that at least one of the ester groups is selected from b) or d). While any combination of a), b), c), and/or d) can be present in an acrylate polymer of this invention, preferred combinations of ester groups include b) and d); c) and d); a), b), and d); a), c), and d); b), c), and d); two different ester groups of b); and especially a), b), c), and d). Within the preferred combinations, it is further preferred to have at least two different ester groups of type b) and/or at least two different ester groups of type d). Still more preferably, at least two different ester groups of types b) and d) are present in the acrylate polymer.

In the acrylate polymers of the invention, the relative amount of any one ester group to another ester group can vary widely, e.g., from 0.1:1 to 1:0.1. Preferred relative amounts when the combination of ester groups is two different ester groups of b) are a mole ratio of about 0.5:1 to about 1.5:1; when the combination of ester groups is b) and d) are a mole ratio in the range of about 0.1:1 to about 1:1; when the combination of ester groups is c) and d) are a mole ratio in the range of about 0.1:1 to about 0.75:1; when the combination of ester groups is a), b), and d) are a mole ratio in the range of about 0.75:0.25:1 to about 2:1:1; when the combination of ester groups is a), c), and d) are a mole ratio in the range of about 0.1:0.5:1 to about 0.75:1.5:1; when the combination of ester groups is b), c), and d) in a mole ratio in the range of about 0.1:0.5:1 to about 0.75:1:1; and when the combination of ester groups is a), b), c), and d) are a mole ratio in the range of about 0.25:0.1:0.25:1 to about 1.5:1:2.5:1.

The acrylate polymers of this invention typically have weight average molecular weights (Mw) in the range of about 25,000 to about 100,000, with some ranging up to about 150,000, as determined by size exclusion chromatography.

The aralkyl groups of the acrylate polymer have aromatic moieties which can be unfused rings (e.g., phenyl or biphenyl) or fused rings (e.g., naphthyl or anthryl), and preferably have about seven to about twenty-five carbon atoms. Examples of suitable aralkyl ester groups include benzyl, 4-methylbenzyl, 4-phenylbenzyl, naphthylmethyl, 6-methylnaphthylmethyl, anthrylmethyl, and the like. Preferred ester groups of a) include benzyl groups.

A linear alkylether group in the acrylate polymer has at least one etheric oxygen atom and preferably has at least about four carbon atoms. Preferably, the linear alkylether group has in the range of one to about three etheric oxygen atoms and more preferably has in the range of about six to about twelve carbon atoms. Suitable linear alkylether ester groups include, but are not limited to, 2-n-butoxyethyl, 2-propoxyethyl, 3-propoxypropyl, 2-(2-ethoxyethoxy)ethyl, 3-(1-methoxypropoxy)propyl, 2-(1-n-butoxyethoxy)ethyl, 2-(2-propoxyethoxy)ethyl, 3-(3-propoxypropoxy)propyl, 3-n-butoxypropyl, and 3-[3-(1-methyl)propoxypropoxy]propyl. Preferred ester groups of b) include 3-(1-methoxypropoxy)propyl, 2-(1-n-butoxyethoxy)ethyl, and especially 2-n-butoxyethyl.

In the acrylate polymer, the polyethoxylated alkylaryl groups are aryl moieties to which has at least one alkyl group substituent in the ring(s). Preferably, there is one alkyl group substituent on the aryl moiety. The alkyl group or groups preferably have about three to about fifteen carbon atoms, and can be linear, branched, or cyclic. More preferably, the alkyl group or groups are linear and have about six to about twelve carbon atoms. The extent of ethoxylation is preferably such that in the range of about four to about twelve ethoxy moieties are present in the alkylaryl group. Examples of suitable polyethoxylated alkylaryl ester groups include tetraethoxylated n-butylphenyl, tetraethoxylated tert-butylphenyl, hexaethoxylated pentylphenyl, tetraethoxylated hexylphenyl, pentaethoxylated cyclopentylphenyl, hexaethoxylated cyclohexylphenyl, hexaethoxylated heptylphenyl, nonaethoxylated octylphenyl, decaethoxylated octylphenyl, nonaethoxylated nonylphenyl, decaethoxylated nonylphenyl, decaethoxylated decylphenyl, and the like. Preferred ester groups of c) include nonaethoxylated nonylphenyl, nonaethoxylated octylphenyl, and decaethoxylated octylphenyl.

The polyethoxylated alkyl groups in the acrylate polymer can be linear or branched, and preferably have about six to about twenty carbon atoms excluding those of the ethoxy moieties. Preferably, the polyethoxylated alkyl groups are linear. More preferably, the polyethoxylated alkyl groups have about ten to about twenty carbon atoms excluding those of the ethoxy moieties. The extent of ethoxylation is preferably such that in the range of about four to about fifteen ethoxy moieties are present in the alkyl group. When a range of carbon atoms is listed, it means that the particular substance is a mixture of polyethoxylated alkyl groups in which the number of carbon atoms vary within the stated range. Suitable ethoxylated alkyl ester groups include, but are not limited to, hexaethoxylated $C_9$-$C_{11}$ alkyl, octaethoxylated $C_9$-$C_{11}$ alkyl, nonaethoxylated $C_9$-$C_{11}$ alkyl, hexaethoxylated $C_{12}$-$C_{13}$ alkyl, heptaethoxylated $C_9$-$C_{11}$ alkyl, nonaethoxylated $C_{12}$-$C_{14}$ alkyl, dodecaethoxylated $C_{12}$-$C_{14}$ alkyl, heptaethoxylated $C_{14}$-$C_{15}$ alkyl, nonaethoxylated decyl, and nonaethoxylated $C_{12}$-$C_{15}$ alkyl groups. Preferred ester groups of d) include nonaethoxylated $C_{12}$-$C_{15}$ alkyl groups and dodecaethoxylated $C_{12}$-$C_{16}$ alkyl groups.

In this invention, the processes for preparing acrylate polymers comprise two steps. In the first step, step I), a prepolymerization mixture is formed. One way of forming the prepolymerization mixture is to bring together, in a liquid organic medium, at least one acrylic acid and at least two monoalcohols to form a first reaction mixture, and heat this first reaction mixture. The monoalcohols are selected from the following: A) an aralkyl monoalcohol, B) a linear alkylether monoalcohol, C) an alkylaryl monoalcohol polyethoxylate, and D) an alkyl monoalcohol polyethoxylate, with the proviso that at least one of the monoalcohols is selected from B) or D). An alternate way of forming the prepolymerization mixture is to bring together, in a liquid organic medium, at least two acrylated derivatives of monoalcohols. The acrylated derivatives are selected from the following: A) an acrylated derivative of an aralkyl monoalcohol, B) an acrylated derivative of a linear alkylether monoalcohol, C) an acrylated derivative of a polyethoxylated alkylaryl monoalcohol, and D) an acrylated derivative of a polyethoxylated alkyl monoalcohol, with the proviso that at least one of said acrylated derivatives is selected from B) or D).

As mentioned above, at least one acrylic acid is included in the first reaction mixture. Suitable acrylic acids in the processes of this invention include acrylic acid, methacrylic acid, 2-ethylpropenoic acid, and the like. Preferred acrylic acids include acrylic acid and methacrylic acid, especially acrylic acid. Normally, at least about one equivalent of acrylic acid(s) relative to the monoalcohols is employed in order to achieve maximum formation of the acrylated derivatives.

When forming a first reaction mixture, the liquid organic medium, acrylic acid(s), and the two or more monoalcohols can be brought together in any order. This first reaction mixture is heated to form a prepolymerization mixture. The first reaction mixture is preferably maintained at one or more temperatures in the range of about 105° C. to about 120° C., for a period of time of about 1 to about 4 hours on the laboratory scale. Preferably, the liquid organic medium, acrylic acid(s), and all of the monoalcohols are combined into one first reaction mixture, which is used to form the prepolymerization mixture.

As just described, another way to form a prepolymerization mixture is by bringing together acrylated derivatives. Such acrylated derivatives that are brought together can be formed separately. Such separate formation of the acrylated derivatives can be carried out either on each monoalcohol individually, or on monoalcohols in any combination. For example, three monoalcohols can be transformed into their respective acrylated derivatives individually, or two of these monoalcohols can be combined and transformed into their acrylated derivatives, while the third monoalcohol is individually transformed into an acrylated derivative. The acrylated derivatives, once formed, are combined to form the prepolymerization mixture.

The prepolymerization mixture generally contains acrylated derivatives, and little or no monoalcohol. While small amounts of alcohol may be present in the prepolymerization mixture, it is recommended and preferred that all of the alcohols have been converted to their respective acrylated derivatives.

In the processes for preparing acrylate polymers, the relative amount of any monomeric species to another, whether brought together as monoalcohols or as acrylated derivatives thereof, can vary widely, e.g., from 0.1:1 to 1:0.1. When the combination of monomeric species is two different linear alkylether monoalcohols or acrylated derivatives thereof, preferred relative amounts are a mole ratio of about 0.5:1 to about 1.5:1; when the combination of monomeric species is at least one linear alkylether monoalcohol and at least one polyethoxylated alkyl monoalcohol, or acrylated derivatives thereof, a mole ratio in the range of about 0.1:1 to about 1:1 is preferred; when the combination of monomeric species is at least one polyethoxylated alkylaryl monoalcohol and at least one polyethoxylated alkyl monoalcohol, or acrylated derivatives thereof, a mole ratio in the range of about 0.1:1 to about 0.75:1 is preferred; when the combination of monomeric species at least one aralkyl monoalcohol, at least one linear alkylether monoalcohol and at least one polyethoxylated alkyl monoalcohol, a mole ratio in the range of about 0.75:0.25:1 to about 2:1:1 is preferred; when the combination of monomeric species is at least one aralkyl monoalcohol, at least one polyethoxylated alkylaryl monoalcohol and at least one polyethoxylated alkyl monoalcohol, or acrylated derivatives thereof, a mole ratio in the range of about 0.1:0.5:1 to about 0.75:1.5:1 is preferred; when the combination of monomeric species is at least one linear alkylether monoalcohol, at least one polyethoxylated alkylaryl monoalcohol and at least one polyethoxylated alkyl monoalcohol, or acrylated derivatives thereof, a mole ratio in the range of about 0.1:0.5:1 to about 0.75:1:1 is preferred; and when the combination of monomeric species is at least one aralkyl monoalcohol, at least one linear alkylether monoalcohol, at least one polyethoxylated alkylaryl monoalcohol and at least one polyethoxylated alkyl monoalcohol, or acrylated derivatives thereof, a mole ratio in the range of about 0.25:0.1:0.25:1 to about 1.5:1:2.5:1 is preferred.

In step II) of the processes for preparing acrylate polymers, at least one free radical initiator is brought together with at least a portion of the prepolymerization mixture from step I) to form a polymerization reaction mixture. The polymerization mixture is heated to a temperature of at least about 70° C. to form an acrylate polymer.

At least one free-radical initiator is employed in step II). Typical free radical initiators that can be used in step II) of the processes for preparing acrylate polymers include 2,2'-azoisobutyronitrile, 2,2'-azobis(2-methylbutyronitrile), 2,2'-azobis(2-methylpentanenitrile), azobiscyanovaleric acid, and the like. Preferred free radical initiators include azoisobutyronitrile, azobiscyanovaleric acid, or a combination thereof. The amount of free radical initiator in the processes of the invention is typically in the range of about 0.01 mole % to about 5 mole % relative to the total moles of monomeric species brought together in step I). More preferably, amount of free radical initiator in the processes of the invention is typically in the range of about 0.02 mole % to about 1 mole % relative to the total moles of monomeric species brought together in step I).

Temperatures for step II) of the processes of this invention usually range from about 70° C. to about 115° C. Preferably, the temperatures are in the range of about 70° C. to about 100° C. In a particularly preferred way of operating, the polymerization mixture is heated to a temperature of at least about 70° C. for the most of the polymerization reaction time (e.g., 2 hours), and then heated to a higher temperature (e.g., 115° C.) for the remainder of the polymerization reaction time (e.g., 15 minutes).

In the processes of this invention, the liquid organic medium is comprised of one or more hydrocarbons having about six or more carbon atoms. Such hydrocarbons include saturated and aromatic hydrocarbons. Preferably, the liquid organic medium is comprised of at least one aromatic hydrocarbon. Suitable hydrocarbons include toluene, xylenes, heavy aromatic distillate (HAD), Superlactolene (Ashland Chemical Company), and the like. Preferred hydrocarbons as the liquid organic medium include heavy aromatic distillates and Superlactolene. Other hydrocarbons such as saturated hydrocarbons (e.g., pentane, hexanes) can be used in addition to the aromatic hydrocarbon(s) to comprise the liquid organic medium. Heavy aromatic distillate is a hydrogenated by-product from ethylene production, and typically contains about 70% aromatic hydrocarbons; the non-aromatic moieties in heavy aromatic distillate are predominately cyclic hydrocarbons. Superlactolene is a mixture of aliphatic and aromatic hydrocarbons, which include pentane, hexane, toluene, and xylenes.

Acrylated derivatives of the aralkyl monoalcohols, linear alkylether monoalcohols, polyethoxylated alkylaryl monoalcohols, and polyethoxylated alkyl monoalcohols can be made via reaction of the monoalcohol(s) with one or more acrylic acids by known esterification procedures.

The aralkyl monoalcohols, like the aralkyl groups described above, have aromatic moieties which can be unfused rings or fused rings, and preferably have about seven to about twenty-five carbon atoms. Suitable aralkyl monoalcohols include benzyl alcohol, 4-methylbenzyl alcohol, naphthylmethyl alcohol, 6-methylnaphthylmethyl alcohol, anthrylmethyl alcohol, and the like. A preferred monohydric alcohol in the practice of this invention is benzyl alcohol.

Linear alkylether monoalcohols, as for the linear alkylether groups described above, have at least one etheric oxygen atom and preferably have at least about four carbon atoms. Preferably, the linear alkylether monoalcohol has in the range of one to about three etheric oxygen atoms and in the range of about six to about twelve carbon atoms. Suitable linear alkylether monoalcohols include, but are not limited to, ethylene glycol butyl ether, ethylene glycol monopropyl ether, di(propylene glycol) methyl ether, diethylene glycol ethyl ether, diethylene glycol butyl ether, diethylene glycol monopropyl ether, di(propylene glycol) propyl ether, propylene glycol monopropyl ether, propylene glycol monobutyl ether, and tri(propylene glycol) methyl ether. Preferred linear alkylether monoalcohols include di(propylene glycol) methyl ether, diethylene glycol butyl ether, and especially ethylene glycol butyl ether.

The polyethoxylated alkylaryl monoalcohols, as in the polyethoxylated alkylaryl groups described above, have aryl moieties which have at least one alkyl group substituent in the ring(s). Preferably, there is one alkyl group substituent on the aryl moiety. The alkyl group or groups preferably have about three to about fifteen carbon atoms, and can be linear, branched, or cyclic. Preferably, the alkyl group or groups are linear and have about six to about twelve carbon atoms. The extent of ethoxylation is preferably such that in the range of about four to about twelve ethoxy moieties are present in the alkylaryl monoalcohol. Examples of suitable polyethoxylated alkylaryl monoalcohols include tetraethoxylated n-butylphenol, tetraethoxylated tert-butylphenol, hexaethoxylated pentylphenol, tetraethoxylated hexylphenol, pentaethoxylated cyclopentylphenol, hexaethoxylated cyclohexylphenol, hexaethoxylated heptylphenol, nonaethoxylated octylphenol, decaethoxylated octylphenol, nonaethoxylated nonylphenol, decaethoxylated nonylphenol, decaethoxylated decylphenol, and the like. Preferred polyethoxylated alkylaryl monoalcohols include nonaethoxylated octylphenol and decaethoxylated octylphenol.

A polyethoxylated alkyl monoalcohol, like the polyethoxylated alkyl groups described above, can be linear or branched, and preferably has about six to about twenty carbon atoms excluding those of the ethoxy moieties. Preferably, the polyethoxylated alkyl monoalcohols are linear and have about ten to about twenty carbon atoms excluding those of the ethoxy moieties. The extent of ethoxylation is preferably such that in the range of about four to about fifteen ethoxy moieties are present in the alkyl monoalcohol. When a range of carbon atoms is listed, it means that the particular substance is a mixture of polyethoxylated alkyl monoalcohols in which the number of carbon atoms vary within the stated range. Suitable ethoxylated alkyl monoalcohols include, but are not limited to, hexaethoxylated $C_9$-$C_{11}$ alcohol, octaethoxylated $C_9$-$C_{11}$ alcohol, nonaethoxylated $C_9$-$C_{11}$ alcohol, hexaethoxylated $C_{12}$-$C_{13}$ alcohol, heptaethoxylated $C_9$-$C_{11}$ alcohol, nonaethoxylated $C_{12}$-$C_{14}$ alcohol, dodecaethoxylated $C_{12}$-$C_{14}$ alcohol, heptaethoxylated $C_{14}$-$C_{15}$ alcohol, nonaethoxylated decanol, and nonaethoxylated $C_{12}$-$C_{15}$ alcohol. Preferred polyethoxylated alkyl monoalcohols include nonaethoxylated $C_{12}$-$C_{15}$ alcohol and dodecaethoxylated $C_{12}$-$C_{14}$ alcohol.

This invention provides, as stated above, processes for breaking a water/oil emulsions, in which the improvement comprises including an acrylate polymer of this invention in the process.

The acrylate polymers of this invention can be used alone or can be blended with other emulsion breaker components. If used alone, the acrylate polymers of the invention are typically dissolved in a suitable solvent to give a solution having about 20 wt % to about 40 wt % acrylate polymer. Most of the acrylate polymers are soluble in aromatic hydrocarbons. Suitable solvents include benzene, toluene, xylenes, chlorobenzene, diethylbenzene, amylbenzene, tetrahydronaphthalene, heavy aromatic distillate, and the like. Preferred solvents include toluene and heavy aromatic distillate.

Other emulsion breakers that can be used with the acrylate polymers include complex esters, alkoxylated phenols, alkoxylated alcohols, polyethylene or polypropylene glycols and their derivatives, arylsulfonates, and the like.

The acrylate polymers of this invention may also be used in combination with corrosion inhibitors, viscosity reducers, and other additives used in the recovery of hydrocarbons from subterranean formations, and the refining thereof.

With respect to resolving emulsions encountered during the recovery of hydrocarbons from subterranean formations, the acrylate polymers are usually introduced into the crude oil emulsion by injection into the crude oil at the wellhead or by injection into the crude oil stream at a point between the wellhead and the oil storage tank. The acrylate polymer may be injected in batch mode or continuously.

Another type of emulsion that can be treated with the acrylate polymers of this invention is a refinery desalting emulsion. In a refinery desalting process, the incoming crude oil is normally deliberately mixed with wash water to remove dissolved salts and other contaminants. To extract water from the resulting emulsion, the emulsion is brought into contact with an effective amount of an acrylate polymer of this invention, after which the crude oil and water phases are separated. The acrylate polymer can be introduced with the water and/or the crude oil before mixing of the water and crude oil, at the time of mixing of the water and crude oil, or after the water and crude oil are mixed.

The amount of acrylate polymer of the invention used as a demulsifier depends on the particular crude oil emulsion being treated. Tests as described herein may be conducted in order to determine the optimum amount for a given purpose. For recovery of hydrocarbons from subterranean formations, typical amounts of acrylate polymer are in the range of about 25 ppm to about 500 ppm. For emulsions in desalting processes, typical amounts of acrylate polymer are in the range of about 25 ppm to about 150 ppm.

Emulsions that have been treated with an acrylate polymer of this invention are allowed to stand until the desired separation into distinct layers of water and oil results. Once separation into distinct layers of water and oil has been effected, various means known in the art can be utilized for removing the water layer from the crude oil layer.

The following examples are presented for purposes of illustration, and are not intended to impose limitations on the scope of this invention.

Example 1

A clean, dry reactor was equipped with an air sparge, a thermocouple-controlled heating oil bath, a stirring motor, a water cooled condenser, and a Dean Stark condensate trap. All of the ingredients list below in Table 1 except the azoisobutyronitrile and azobiscyanovaleric acid (the initiators) were added to the reactor in the order listed. Via the oil bath, the reaction mixture was heated to a maximum of 130° C. with an air blanket above the solution. Heating was continued until 90+% of the theoretical amount of water was collected, without exceeding a reactor skin temperature of 130° C. When the amount of water of reaction collected reached the 90+% range, samples were titrated for acid by the Acid Number Method. When no decrease in free acid was observed in two consecutive titrations separated by 30 minutes of refluxing, the polymerization process was begun.

The reactor was cooled to 90° F. (32° C.) and the remaining air was purged from the reactor by pulling a full vacuum, being careful not to burp the reactor contents into the decanter to remove any air. The vacuum was then replaced with a blanket of nitrogen. The azoisobutyronitrile, as a 10% solution in Superlactolene (a mixture of aliphatic and aromatic hydrocarbons) and azobiscyanovaleric acid were then added to the reactor via a pump. The temperature was allowed to rise to 135° C.; heat was applied to maintain that temperature for 8 hours after the addition of the initiators.

Example 2

The procedure of Example 1 was repeated except that no isopropylamine dodecylbenzene sulfonate or azobiscyanovaleric acid were used, and the amount of azoisobutyronitrile was 5.0 grams.

Example 3

A clean, dry reactor was equipped with an air sparge, a thermocouple-controlled heating oil bath, a stirring motor, a water cooled condenser, and a Dean Stark condensate trap. Nonaethoxylated octylphenol (Triton X-100, Dow Chemical Company), nonaethoxylated $C_{12}$-$C_{15}$ alcohol (Neodol® 25-9, Shell Chemicals), methanesulfonic acid, MEHQ, acrylic acid, and Superlactolene 2B were added to the reactor in the amounts shown below in Table 1 for Run 1. Via the oil bath, the reaction mixture was heated to a maximum of 130° C. with an air blanket above the solution. Heating was continued until 90+% of the theoretical amount of water was collected, without exceeding a reactor skin temperature of 130° C. When the amount of water of reaction collected reached the 90+% range, samples were titrated for acid by the Acid Number Method. When no decrease in free acid was observed in two consecutive titrations separated by 30 minutes of refluxing, a portion of the product solution was used in the polymerization.

To a separate reactor equipped as just described, benzyl alcohol, ethylene glycol butyl ether, dipropylene glycol propyl ether, nonaethoxylated octylphenol (Triton X-100), nonaethoxylated $C_{12}$-$C_{15}$ alcohol (Neodol® 25-9), methanesulfonic acid, MEHQ, acrylic acid, methacrylic acid, and Superlactolene 2B were added in the amounts shown below in Table 1 for Run 2. Via the oil bath, the reaction mixture was heated to a maximum of 130° C. with an air blanket above the solution. Heating was continued until 90+% of the theoretical amount of water was collected, without exceeding a reactor skin temperature of 130° C. When the amount of water of reaction collected reached the 90+% range, samples were titrated for acid by the Acid Number Method. When no decrease in free acid was observed in two consecutive titrations separated by 30 minutes of refluxing, heating was stopped and this first product solution was allowed to cool to room temperature. To 246.5 grams of this first product solution were added previously-prepared 2-n-butoxyethyl acrylate (92 g) and 2-(2-propoxyethoxy)ethyl acrylate (109.6 g), to form a combined product solution. A portion of this combined product solution was used in the polymerization.

A portion of the product solution prepared from Run 1 (40 g) and a portion of the combined product solution just described for Run 2 (50 g) were combined in one reactor. Heavy aromatic distillate and Witco® 93S were also added to the reactor. The reactor was cooled to 90° F. (32° C.) and the remaining air was purged from the reactor by pulling a full vacuum, being careful not to burp the reactor contents into the decanter to remove any air. The vacuum was then replaced with a blanket of nitrogen. Azoisobutyronitrile (10% in Superlactolene) and azobiscyanovaleric acid were then added to the reactor in the amounts shown in Table 1 via a pump. The temperature was allowed to rise to 135° C.; heat was applied to maintain that temperature for 8 hours after the addition of the initiators.

TABLE 1

| Reagent | Example 1 | Ex. 3 - Run 1 | Ex. 3 - Run 2 |
|---|---|---|---|
| Benzyl alcohol | 24.45 g | — | 15.4 g |
| Ethylene glycol butyl ether | 12.75 g | — | 32.9 g |
| Dipropylene glycol methyl ether | 5.5 g | — | — |
| Dipropylene glycol propyl ether | — | — | 30.55 g |
| Diethylene glycol butyl ether | 0.39 g | — | — |

TABLE 1-continued

| Reagent | Example 1 | Ex. 3 - Run 1 | Ex. 3 - Run 2 |
|---|---|---|---|
| Heavy aromatic distillate | 70 g | — | 32.2 g |
| Isopropylamine dodecylbenzene sulfonate[f] | 11.18 g | — | 9 g |
| Azoisobutyronitrile[g] | 0.31 g | — | 0.27 g |
| Azobiscyanovaleric acid | 0.2 g | — | 0.25 g |

[a]Surfonic® OP-100, Huntsman Corporation
[b]Triton™ X-100, Dow Chemical Company
[c]Neodol® 25-9, Shell Chemicals
[d]Surfonic® L24-12, Huntsman Corporation
[e]A mixture of aliphatic and aromatic hydrocarbons, Ashland Chemical Company
[f]Witco® 93S or Witconate 93S, Akzo Nobel
[g]Vazo®64, DuPont Example 4

The products of Examples 1-3 were subjected to standard tests of their effectiveness against various emulsions. Results of these tests are summarized in Table 2. For each run of the test, an emulsion breaker was added to a crude oil emulsion in an amount that gave the concentration indicated in Table 2. The amount of water falling out of the emulsion (the water drop volume) was monitored over time.

For the grindout tests, a 50% solution of the resolved emulsion (using material from the center of the tube) in xylene was made. Each of the 50% xylene/resolved emulsion solutions were placed in a centrifuge and spun at 3,000 rpm for 15 minutes, after which the graduated centrifuge tubes were read to determine the percent of remaining Basic Sediment and Water or BS&W remains. The tubes containing the least amount of BS&W remains were judged to be the best results.

TABLE 2

| Product | Conc. | Water drop volume | | | | | | | Grindout | | | Formation (Emulsion) |
|---|---|---|---|---|---|---|---|---|---|---|---|---|
| | | 15 min | 30 min | 45 min | 1 hr. | 2 hr. | 3 hr. | 4 hr. | Total | H₂O | BS[a] | |
| Ex. 1 | 250 ppm | | | | 18 mL | 30 mL | | 35 mL | 2.0% | 1.6% | 0.4% | PXP Midway |
| | 500 ppm | | | | 19 mL | 20 mL | | 20 mL | 2.0% | 0.8% | 0.8% | |
| | 750 ppm | | | | 12 mL | 12 mL | | 12 mL | 1.6% | 0.8% | 0.8% | |
| Ex. 1 | 250 ppm | | 18 mL | | 30 mL | | | | 2.0% | 1.6% | 0.4% | PXP Bremer |
| | 500 ppm | | 19 mL | | 20 mL | 20 mL | | | 2.0% | 0.8% | 1.2% | |
| | 750 ppm | | 12 mL | | 12 mL | 12 mL | | | 1.6% | 0.8% | 0.8% | |
| Ex. 2 | 80 ppm | | | | 40 mL | 42 mL | | 42 mL | 3.2% | 2.8% | 0.4% | Chevron San Ardo |
| | 160 ppm | | | | 40 mL | 42 mL | | 42 mL | 2.4% | 0.8% | 1.6% | 8-4-6 |
| Ex. 2 | 100 ppm | | trace | | 8 mL | 15 mL | 40 mL | | 20% | 7% | 13% | ? |
| | 200 ppm | | trace | | trace | 10 mL | 40 mL | | 6.0% | 2.4% | 3.6% | 8-4-6 |
| Ex. 2 | 100 ppm | | | | 6 mL | 18 mL | | 30 mL | 3.0% | 3.0% | 0 | PXP Bremer |
| | 250 ppm | | | | 6.5 mL | 24 mL | | 32 mL | 1.0% | 0.6% | 0.4% | 11-7-6B |
| | 500 ppm | | | | 8.5 mL | 24 mL | | 32 mL | 2.0% | 1.6% | 0.4% | |
| Ex. 3 | 60 ppm | 21 mL | 27 mL | 27 mL | | | | | 2.4% | 1.6% | 0.8% | Apache - Ryan |
| | 120 ppm | 22 mL | 23 mL | 23 mL | | | | | 1.6% | 1.2% | 0.4% | |
| Ex. 3 | 60 ppm | 10 mL | 19 mL | 22 mL | | | | | 41% | 41% | 0 | Amerada Hess Deep F #2 |
| | 120 ppm | 16 mL | 30 mL | 40 mL | | | | | 8% | 6% | 2% | |
| Ex. 3 | 240 ppm | 1 mL | 5 mL | 12 mL | | | | | 0.8% | 0.4% | 0.4% | Hess SSAU 5507 |
| Ex. 3 | 100 ppm | | 20 mL | | | 20 mL | 65 mL | 70 mL | 6.0% | 2.0% | 4.0% | PXP Bremer |
| | 200 ppm | | 42 mL | | | 42 mL | 55 mL | 55 mL | 4.0% | 0.8% | 3.2% | |

[a]BS stands for basic sediment.

TABLE 1-continued

| Reagent | Example 1 | Ex. 3 - Run 1 | Ex. 3 - Run 2 |
|---|---|---|---|
| Decaethoxylated octylphenol[a] | 78.89 g | — | — |
| Nonaethoxylated octylphenol[b] | — | 160.5 g | 90.25 g |
| Nonaethoxylated C₁₂-C₁₅ alcohol[c] | 44.44 g | 3.83 g | 52.2 g |
| Dodecaethoxylated C₁₂-C₁₆ alcohol[d] | 6.97 g | — | — |
| Superlactolene 2B[e] | 200 g | 13.25 g | 32.2 g |
| Methanesulfonic acid | 5 g | 0.41 g | 4 g |
| Hydroquinone methyl ether (MEHQ) | 0.35 g | 0.03 g | 0.17 g |
| Glacial acrylic acid | 50 g | 10.3 g | 34.7 g |
| Methacrylic acid | — | — | 15.55 g |

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent, patent application and printed publication referred to above is incorporated herein by reference in toto to the fullest extent permitted as a matter of law.

This invention is susceptible to considerable variation in its practice. Therefore the foregoing description is not intended to limit, and should not be construed as limiting, the invention to the particular exemplifications presented hereinabove.

That which is claimed is:

1. An acrylate polymer having at least two different ester groups selected from the group consisting of:
   a) an aralkyl group;
   b) a linear alkylether group;
   c) a polyethoxylated alkylaryl group; and
   d) a polyethoxylated alkyl group,
with the proviso that at least one of said ester groups is selected from b) or d).

2. In a process for breaking a water/oil emulsion, the improvement which comprises contacting an acrylate polymer of claim 1 and said emulsion.

3. An improvement as in claim 2 wherein said emulsion is encountered during the recovery of hydrocarbons from subterranean formations.

4. An improvement as in claim 2 wherein said emulsion is a refinery desalting emulsion.

5. An improvement as in claim 2 wherein, in said polymer,
   said aralkyl groups of a) have about seven to about twenty-five carbon atoms; or
   said linear alkylether groups of b) have at least about four carbon atoms and in the range of one to about three etheric oxygen atoms; or
   said polyethoxylated alkylaryl groups of c) have aryl moieties with one alkyl group substituent on said aryl moiety; or
   said polyethoxylated alkyl groups of d) are linear, and have about six to about twenty carbon atoms excluding those of the ethoxy moieties.

6. An improvement as in claim 2 wherein, in said polymer, said aralkyl groups of a) are benzyl groups; or said linear alkylether groups of b) are selected from the group consisting of 3-(1-methoxypropoxy)propyl, 2-(1-n-butoxyethoxy)ethyl, and 2-n-butoxyethyl groups; or said polyethoxylated alkylaryl groups of c) are selected from the group consisting of nonaethoxylated octylphenyl and decaethoxylated octylphenyl groups; or said polyethoxylated alkyl groups of d) are nonaethoxylated $C_{12}$-$C_{15}$ alkyl groups.

7. An improvement as in claim 2 wherein said polymer has ester groups selected from
   two different ester groups of b); or
   b) and d); or
   c) and d); or
   a), b), and d); or
   a), c), and d); or
   b), c), and d); or
   a), b), c), and d).

8. An improvement as in claims 2 wherein said polymer has ester groups selected from
   two different ester groups of b) in a mole ratio of about 0.5:1 to about 1.5:1; or
   b) and d) in a mole ratio in the range of about 0.1:1 to about 1:1; or
   c) and d) in a mole ratio in the range of about 0.1:1 to about 0.75:1; or
   a), b), and d) in a mole ratio in the range of about 0.75:0.25:1 to about 2:1:1; or
   a), c), and d) in a mole ratio in the range of about 0.1:0.5:1 to about 0.75:1.5:1; or
   b), c), and d) in a mole ratio in the range of about 0.1:0.5:1 to about 0.75:1:1; or
   a), b), c), and d) in a mole ratio in the range of about 0.25:0.1:0.25:1 to about 1.5:1:2.5:1.

9. A polymer as in claim 1 wherein
   said aralkyl groups of a) have about seven to about twenty-five carbon atoms; or
   said linear alkylether groups of b) have at least about four carbon atoms and in the range of one to about three etheric oxygen atoms; or
   said polyethoxylated alkylaryl groups of c) have aryl moieties with one alkyl group substituent on said aryl moiety; or
   said polyethoxylated alkyl groups of d) are linear, and have about six to about twenty carbon atoms excluding those of the ethoxy moieties.

10. A polymer as in claim 1 wherein said aralkyl groups of a) are benzyl groups; or said linear alkylether groups of b) are selected from the group consisting of 3-(1-methoxypropoxy)propyl, 2-(1-n-butoxyethoxy)ethyl, and 2-n-butoxyethyl groups; or said polyethoxylated alkylaryl groups of c) are selected from the group consisting of nonaethoxylated octylphenyl and decaethoxylated octylphenyl groups; or said polyethoxylated alkyl groups of d) are nonaethoxylated $C_{12}$-$C_{15}$ alkyl groups.

11. A polymer as in claim 1 wherein said polymer has ester groups selected from
   two different ester groups of b); or
   b) and d); or
   c) and d); or
   a), b), and d); or a), c), and d); or
b), c), and d); or
a), b), c), and d).

12. A polymer as in claim 1 wherein said polymer has ester groups selected from
   two different ester groups of b) in a mole ratio of about 0.5:1 to about 1.5:1; or
   b) and d) in a mole ratio in the range of about 0.1:1 to about 1:1; or
   c) and d) in a mole ratio in the range of about 0.1:1 to about 0.75:1; or
   a), b), and d) in a mole ratio in the range of about 0.75:0.25:1 to about 2:1:1; or
   a), c), and d) in a mole ratio in the range of about 0.1:0.5:1 to about 0.75:1.5:1; or
   b), c), and d) in a mole ratio in the range of about 0.1:0.5:1 to about 0.75:1:1; or
   a), b), c), and d) in a mole ratio in the range of about 0.25:0.1:0.25:1 to about 1.5:1:2.5:1.

13. A process for preparing acrylate polymers, which process comprises
   I) bringing together, in a liquid organic medium, at least one acrylic acid, and at least two monomeric species selected from the group consisting of:
      A) an aralkyl monoalcohol,
      B) a linear alkylether monoalcohol,
      C) a polyethoxylated alkylaryl monoalcohol, and
      D) a polyethoxylated alkyl monoalcohol,
      with the proviso that at least one of said monomeric species is selected from B) or D), to form a first reaction mixture, and heating said first reaction mixture to form a prepolymerization mixture;
   or bringing together, in a liquid organic medium, at least two monomeric species selected from the group consisting of:
      A) an acrylated derivative of an aralkyl monoalcohol,
      B) an acrylated derivative of a linear alkylether monoalcohol,
      C) an acrylated derivative of a polyethoxylated alkylaryl monoalcohol, and
      D) an acrylated derivative of a polyethoxylated alkyl monoalcohol,
      with the proviso that at least one of said monomeric species is selected from B) or D), to form a prepolymerization mixture; and
   II) bringing together at least one free radical initiator and at least a portion of the prepolymerization mixture from I), to form a polymerization reaction mixture, and heating said polymerization reaction mixture to a temperature of at least about 60° C., to form an acrylate polymer.

14. A process as in claim 13 wherein a first reaction mixture is formed.

15. A process as in claim 14 wherein said acrylic acid is acrylic acid or methacrylic acid.

16. A process as in claim 13 wherein said free radical initiator is azoisobutyronitrile, azobiscyanovaleric acid, or a combination thereof.

17. A process as in claim 13 wherein
   A) is an aralkyl monoalcohol having about seven to about twenty-five carbon atoms, or an acrylated derivative thereof; or
   B) is a linear alkylether monoalcohol having at least about four carbon atoms and in the range of one to about three etheric oxygen atoms, or an acrylated derivative thereof; or
   C) is a polyethoxylated alkylaryl monoalcohol having an aryl moiety with one alkyl group substituent on said aryl moiety, or an acrylated derivative thereof; or
   D) is a polyethoxylated alkyl monoalcohol which is linear, and has about six to about twenty carbon atoms excluding those of the ethoxy moieties, or an acrylated derivative thereof.

18. A process as in claim 13 wherein
   A) is benzyl alcohol or an acrylated derivative thereof; or
   B) is selected from group consisting of di(propylene glycol) methyl ether, diethylene glycol butyl ether, and ethylene glycol butyl ether, and acrylated derivatives thereof; or
   C) is selected from the group consisting of nonaethoxylated octylphenol, decaethoxylated octylphenol, and acrylated derivatives thereof; or
   D) is nonaethoxylated $C_{12}$-$C_{15}$ alkyl groups or an acrylated derivative thereof.

19. A process as in claim 13 wherein said monomeric species are selected from
   two different monomeric species of B); or
   B) and D); or
   C) and D); or
   A), B), and D); or
   A), C), and D); or
   B), C), and D); or
   A), B), C), and D).

20. A process as in claim 13 wherein said monomeric species are selected from
   two different monomeric species of B) in a mole ratio of about 0.5:1 to about 1.5:1; or
   B) and D) in a mole ratio in the range of about 0.1:1 to about 1:1; or
   C) and D) in a mole ratio in the range of about 0.1:1 to about 0.75:1; or
   A), B), and D) in a mole ratio in the range of about 0.75:0.25:1 to about 2:1:1; or
   A), C), and D) in a mole ratio in the range of about 0.1:0.5:1 to about 0.75:1.5:1; or
   B), C), and D) in a mole ratio in the range of about 0.1:0.5:1 to about 0.75:1:1; or
   A), B), C), and D) in a mole ratio in the range of about 0.25:0.1:0.25:1 to about 1.5:1:2.5:1.

* * * * *